(12) United States Patent
Raghavan et al.

(10) Patent No.: US 7,966,330 B2
(45) Date of Patent: *Jun. 21, 2011

(54) TECHNIQUES FOR PARTITION PRUNING

(75) Inventors: Ananth Raghavan, San Francisco, CA (US); Shrikanth Shankar, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/903,013

(22) Filed: Oct. 12, 2010

(65) Prior Publication Data

US 2011/0029557 A1  Feb. 3, 2011

Related U.S. Application Data

(63) Continuation of application No. 11/124,454, filed on May 4, 2005, now Pat. No. 7,814,104.

(51) Int. Cl.
*G06F 17/30* (2006.01)
*G06F 15/16* (2006.01)

(52) U.S. Cl. ............ 707/737; 707/794; 706/12; 706/45

(58) Field of Classification Search .................. 707/755, 707/776, 736, 737, 794, 696, 999.01–999.206; 1/1; 706/12, 45
See application file for complete search history.

(56) References Cited

U.S. PATENT DOCUMENTS

| | | | |
|---|---|---|---|
| 5,222,234 A | 6/1993 | Wang et al. | |
| 5,515,531 A | 5/1996 | Fujiwara et al. | |
| 5,600,831 A | 2/1997 | Levy et al. | |
| 6,003,036 A | 12/1999 | Martin | |
| 6,014,656 A | 1/2000 | Hallmark et al. | |
| 6,341,289 B1 | 1/2002 | Burroughs et al. | |
| 6,438,562 B1 | 8/2002 | Gupta et al. | |
| 6,484,179 B1 | 11/2002 | Roccaforte | |
| 6,587,854 B1 | 7/2003 | Guthrie et al. | |
| 6,665,684 B2 * | 12/2003 | Zait et al. ............................. | 1/1 |
| 6,816,853 B1 | 11/2004 | Agarwal et al. | |
| 6,842,753 B2 | 1/2005 | Chaudhuri et al. | |
| 6,931,390 B1 | 8/2005 | Zait et al. | |
| 6,957,225 B1 | 10/2005 | Zait et al. | |
| 6,965,891 B1 | 11/2005 | Jakobsson et al. | |

(Continued)

OTHER PUBLICATIONS

Oracle Corp., "Parallelism and Partitioning," Oracle8iData Warehousing Guide, Release 2 (8.1.6), chapter 5, retrieved from internet at <http://download-uk.oracle.com/docs/cd/A87860_01/doc/server.817/a76994/parpart.htm> retrieved on Nov. 4, 2005 (16 pages).

Sybase, Transact-SQL Guide, Adaptive Server Enterprise 15.0, Oct. 2005, pp. 363-371.

(Continued)

*Primary Examiner* — Greta L Robinson
*Assistant Examiner* — Dennis Truong
(74) *Attorney, Agent, or Firm* — Hickman Palermo Truong & Becker LLP; Daniel D. Ledesma

(57) ABSTRACT

Techniques are described for performing partition pruning in situations where previous database servers could not. Specifically, techniques are provided for (1) performing partition pruning based on predicates that involve non-prefix subsets of composite partitioning keys, (2) performing partition pruning when a global index access path is used to execute a query, and (3) performing partition pruning when predicates on partitioning columns are OR-ed together. More generally, techniques are described for partition pruning based on a non-contiguous set of not-pruned partitions.

18 Claims, 1 Drawing Sheet

U.S. PATENT DOCUMENTS

| | | |
|---|---|---|
| 7,020,656 B1 | 3/2006 | Gong |
| 7,020,661 B1 * | 3/2006 | Cruanes et al. ............... 1/1 |
| 2003/0009456 A1 * | 1/2003 | Shintani et al. ............. 707/6 |
| 2005/0065926 A1 * | 3/2005 | Chen et al. ............... 707/4 |
| 2006/0047622 A1 | 3/2006 | Folkert et al. |
| 2010/0070448 A1 | 3/2010 | Omoigui |

OTHER PUBLICATIONS

"Oracle Database Administrator's Guide", 10g Release 1 (10.1), Part No. B10739-01, Dec. 2003-Chapter 16 "Managing Partitioned Tables and Indexes" pp. 1-25.

* cited by examiner

TECHNIQUES FOR PARTITION PRUNING

CLAIM OF PRIORITY

This application is a continuation of U.S. patent application Ser. No. 11/124,454, which was filed on May 4, 2005, issued as U.S. Pat. No. 7,814,104 on Oct. 12, 2010, and is incorporated herein by reference as if fully set forth herein under 35 U.S.C. §120.

FIELD OF THE INVENTION

The present invention relates to accessing data stored in partitioned objects and, more specifically, techniques for performing partition pruning.

BACKGROUND

In conventional relational database tables, rows are inserted into a table without regard to any type of ordering. Consequently, when a user submits a query that selects data from the table based on a particular value or range of values, the entire table has to be scanned to ensure that all rows that satisfy the criteria are identified.

Partitioning is a technique that, in certain situations, avoids the need to search an entire table (or other database object). With partitioning, an object, such as a database table, is divided up into sub-tables, referred to as "partitions". The most common form of partitioning is referred to as range partitioning. With range partitioning, each individual partition corresponds to a particular range of values for one or more columns of the table.

Typically, the criteria used to partition a database object is specified in the statement that creates the database object. For example, the following Structured Query Language (SQL) statement creates a table "sales" that is range partitioned based on date values contained in a column named "saledate":

```
create table sales
    (saledate DATE,
    productid NUMBER, ...)
    partition by range (saledate)
        partition sal94Q1 values less than to_date (yy-mm-dd,
            '94-04-01')
        partition sal94Q2 values less than to_date (yy-mm-dd,
            '94-07-01')
        partition sal94Q3 values less than to_date (yy-mm-dd,
            '94-10-01')
        partition sal94Q4 values less than to_date (yy-mm-dd,
            '95-01-01')
```

Execution of this statement creates a table named "sales" that includes four partitions: sal94Q1, sal94Q2, sal94Q3, and sal94Q4. Each partition has "bounds" that dictate which rows are stored in the partition. The bounds of a partition typically correspond to a range of partition key values.

For example, in the "sales" table defined above, the partition key is saledate, and the partition named sal94Q1 includes all rows that have a date less than 94-04-01 in their saledate column. Similarly, the partition named sal94Q2 includes all rows that have a date greater than or equal to 94-04-01 but less than 94-07-01 in their saledate column. The partition named sal94Q3 includes all rows that have a date greater than or equal to 94-07-01 but less than 94-10-01 in their saledate column. The partition named sal94Q4 includes all rows that have a date greater than or equal to 94-10-01 but less than 95-01-01 in their saledate column.

When a database server receives a request to perform an operation, the database server makes a plan of how to execute the query. If the operation involves accessing a partitioned object, part of making the plan involves determining which partitions of the partitioned object, if any, can be excluded from the plan (i.e. which partitions need not be accessed to execute the query). The process of excluding partitions from consideration during the execution of a query that accesses a partitioned object is referred to as "partition pruning".

Unfortunately, conventional pruning techniques can only be applied to a limited set of statements. For example, the database server can perform partition pruning when the statement received by the database server explicitly limits itself to a partition or set of partitions. Thus, the database server can exclude from the execution plan of the statement "select * from sales PARTITION(sal94Q1)" all partitions of the sales table other than the sal94Q1 partition.

The database server can also perform partition pruning on statements that do not explicitly limit themselves to particular partitions, but which select data based on the same criteria that was used to partition the partitioned object. For example, the statement:

select * from sales where saledate between (94-04-01) and (94-06-15)

does not explicitly limit itself to particular partitions. However, because the statement limits itself based on the same key (saledate) that was used to partition the sales table, the database server is able to determine, based on the selection criteria of the statement and the bounds of the partitions of the sales table, which partitions need not be accessed during execution of the statement. In the present example, the database server would be able to perform partition pruning that limits the execution plan of the statement to sal94Q2.

Similarly, database servers can perform partition pruning for queries with WHERE clauses that (1) specify equalities that involve the partition key (e.g. where saledate=94-02-05), (2) include IN lists that specify partition key values (e.g. where saledate IN (94-02-05, 94-03-06)), and (3) include IN subqueries that involve the partition key (e.g. where salesdate IN (select datevalue from T)).

In the preceding examples, partition pruning is performed on queries that contain relatively simple predicates (equality predicates, range-based predicates, IN list predicates). However, because partition pruning can significantly decrease the execution time of a query, it is desirable to provide techniques that enable database servers to perform partition pruning in situations where the predicates of the queries are more complex.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
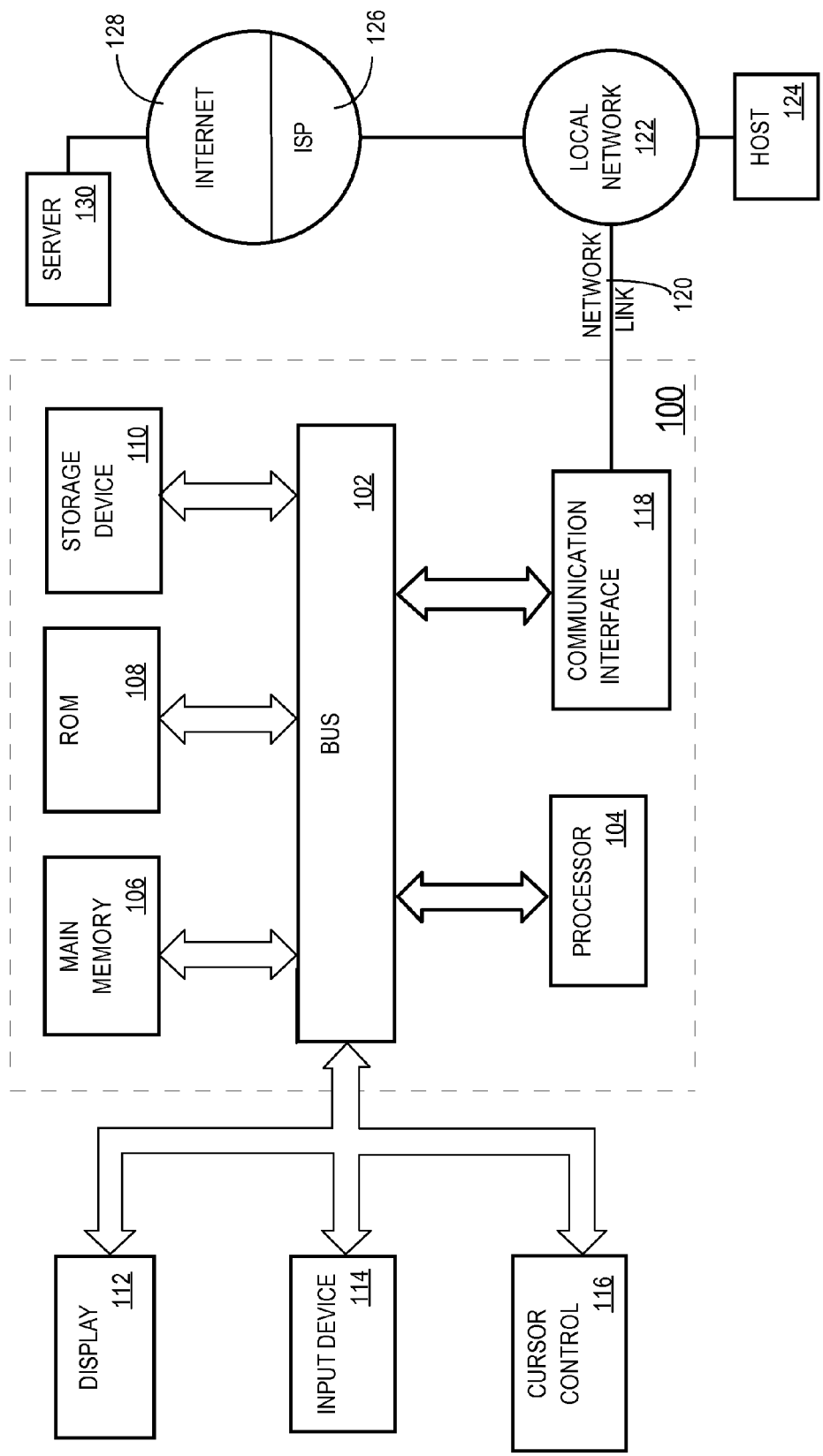
FIG. 1 is a block diagram of a computer system upon which embodiments of the invention may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described hereafter for performing partition pruning in situations where previous database servers could not. Specifically, techniques are provided for (1) performing partition pruning based on predicates that involve non-prefix subsets of composite partitioning keys, (2) performing partition pruning when a global index access path is used to execute a query, and (3) performing partition pruning when predicates on partitioning columns are OR-ed together.

Composite Keys

A composite key is a key composed of values from two or more columns ("key columns"). Values from those key columns ("constituent key values") are combined in a particular order to form a composite key value. For example, assume that a table has a column A and a column B. Assume further that a particular row in the table includes a "5" in column A and a "7" in column B. If the composite key is defined as (A, B), then the composite key value for that particular row is (5, 7). On the other hand, if the composite key is defined as (B, A), then the composite key value for the same row is (7, 5).

The order of the keys is significant when determining the relative order of composite key values. Specifically, the relative order is determined by comparing the constituent key values, from the highest order to the lowest order. Thus, the composite value (5, 90) is less than the composite value (6, 3). Lower order constituent key values determine the order of composite key values only when the higher order constituent key values are the same. For example, (6, 3) is less than (6, 5).

Composite keys can be composed of two or more key columns. For example, a composite key composed of five key columns has the form (A, B, C, D, E), where A, B, C, D, and E are key columns. A contiguous array of key columns that begins with the highest order key column of a composite key is referred to as a "prefix" of the composite key. For example, (A), (A, B), (A, B, C), (A, B, C, D) and (A, B, C, D, E) are all prefixes of the composite key (A, B, C, D, E). In contrast, (A, C) and (B) are not prefixes of the composite key (A, B, C, D, E).

Tables Partitioned on Composite Keys

Techniques shall be described hereafter for performing partition pruning when (1) an object is partitioned based on a composite key, and (2) the query accessing the object has a predicate involves a non-prefix subset of the composite key. According to one embodiment, the database server infers, from the partition definition of an object, the range of values that each partition is able to have for each of the key columns from which the composite key is composed. The range of values a particular key may have in a particular partition is referred to herein as the "constituent-key-range" of that particular key for that particular partition.

For example, consider a table tb1 partitioned as defined by the statement:

```
create table tb1 ( a number, b number) partition by range ( a, b)
  ( partition p0 values less than ( 5, 5),
    partition p1 values less than ( 5, 10),
    partition p2 values less than ( 5, 15),
    partition p3 values less than ( 10, 15) );
```

In this example, the bounds of partition p0 are [(−∞, −∞), (5, 5)). Thus, partition p0 includes (1) all rows where the value of column A is less than 5, and (2) all rows where the value of column A is equal to 5, and the value of column B is less than 5. Consequently, within partition p0, the values in column A can range from −∞ to 5, and the values for column B can range from −∞ to +∞. Thus, for partition p0, the constituent-key-range of column A is −∞ to 5, and the constituent-key-range of column B is −∞ to +∞.

The bounds of partition p1 are [(5, 5), (5, 10)). Thus, partition p1 includes all rows where the value of column A is equal to 5 and the value of column B is greater than or equal 5 but less than 10. Consequently, within partition p1, the values in column A can only be 5, and the values for column B can range from 5 to less than 10. Thus, for partition p1, the constituent-key-range of column A is 5 to 5, and the constituent-key-range of column B is 5 to less than 10.

The bounds of partition p2 are [(5, 10), (5, 15)). Thus, partition p2 includes all rows where the value of column A is equal to 5 and the value of column B is greater than or equal 10 but less than 15. Consequently, within partition p2, the values in column A can only be 5, and the values for column B can range from 10 to less than 15. Thus, for partition p2, the constituent-key-range of column A is 5 to 5, and the constituent-key-range of column B is 10 to less than 15.

The bounds of partition p3 are [(5, 15), (10, 15)). Thus, partition p3 includes (1) all rows where the value of column A is greater than 5 and less than 10, (2) all rows where the value of column A is equal to 5 and the value of column B is greater than or equal 15, and (3) all rows where the value of column A is equal to 10 and the value of column B is less than 15. Consequently, within partition p1, the values for column A can range from 5 to 10, and the values for column B can range from −∞ to +∞. Thus, for partition p3, the constituent-key-range of column A is 5 to 10, and the constituent-key-range of column B is −∞ to +∞.

The following table summarizes the constituent-key-range each partition may have for each key column of the composite key:

TABLE 1

| Partition | Constituent-Key-Range for Column A | Constituent-Key-Range for Column B |
|---|---|---|
| P0 | −∞ to 5 | −∞ to +∞ |
| P1 | 5 | 5 to less than 10 |
| P2 | 5 | 10 to less than 15 |
| P3 | 5 to 10 | −∞ to +∞ |

According to one embodiment, when a database server executes a query against an object that is partitioned on a composite key, the database server performs partition pruning that takes into account all predicates that involve key columns of the composite key, even if the predicates do not involve a prefix of the composite key. For example, assume that table tb1 is partitioned as described above. Assume further that the database receives a query in the form:
select * from tb1 where B<5;

In this example, the predicate only specifies a condition on column B. Since the table tb1 is partitioned on the composite key (A, B), column B is not a prefix of the composite key. Nevertheless, the database server compares the condition B<5 against the constituent-key-range for column B of the partitions of tb1 to determine which partitions may be pruned during execution of that query. In the present example, it is only possible for partitions p0 and p3 to contain data items that would satisfy the condition B<5. Therefore, partitions p1 and p2 are pruned by the database server prior to execution of the query.

Two-Phase Partition Pruning

A partition pruning operation categorizes the partitions of an object as either "pruned" or "not-pruned", relative to a particular query. Pruned partitions are partitions that cannot possibly contain data items that satisfy the conditions specified in the predicate of the query, and therefore do not have to be read during execution of the query. The not-pruned partitions may or may not have data items that satisfy the query.

According to one embodiment, partition pruning is performed both at the time a query is compiled ("compile-time pruning") and at the time that the query is executed ("execution-time pruning"). In one embodiment, the database server uses a relatively quick and coarse pruning analysis during compile-time pruning. During execution-time pruning, the database server performs a more rigorous pruning analysis on each of the partitions that was not pruned during the compile-time pruning operation.

Compile-Time Pruning

In an embodiment that uses two-phase pruning, during the compile-time pruning, the database server identifies an upper bound partition and a lower bound partition. The lower bound and upper bound partitions define a contiguous range of partitions (a "not-pruned range"). All partitions that fall outside the not-pruned range are considered pruned.

To determine the not-pruned range, the database server compares (1) predicates involving a prefix of the composite key against (2) the bounds of the partitions. The highest partition that can possibly contain data items that satisfy the query is selected as the upper bound partition. The lowest partition that can possibly contain data items that satisfy the query is selected as the lower bound partition. Data that identifies the not-pruned range is then stored at compile time for later use by the database server at execution time.

For example, consider a composite key partitioned tabled defined as follows:

```
create table tb2 ( a number, b number) partition by range ( a, b)
( partition p0 values less than ( 5, 5),
  partition p1 values less than ( 5, 10),
  partition p2 values less than ( 5, 15),
  partition p3 values less than ( 10, 5),
  partition p4 values less than ( 10, 10) );
```

Assume that the database server receives the following query:
select * from tb2 where A<6 and B<5;
Table tb2 is partitioned based on the composite partition key (A, B). Key column (A) is a prefix of the composite partition key. Therefore, the condition "A<6" involves a prefix of the composite key. According to one embodiment, the database server applies the condition "A<6" against the bounds of the partitions of tb2. As a result, the not-pruned range is established as p0 through p3. Partition p4 would be excluded because the lower bound of p4 (i.e. 10, 5) does not satisfy the condition "A<6".

According to an alternative embodiment, the database server derives the predicate "(A, B)<(6, 5)" from the query's actual predicate "A<6 and B<5". This derived predicate can then be easily compared against the bounds of the partitions to identify the upper bound and lower bound partitions of the not-pruned range. Use of this derived predicate yields the same not-pruned range of p0 through p3.

As shall be described in greater detail hereafter, predicates that involve lower-ordered key columns of the composite partitioning key are stored for later consideration during the execution-time pruning. In the present example, the database server would store the predicate "B<5".

Execution-Time Pruning

After compile-time pruning, the not-pruned range may still include some partitions that cannot possibly satisfy the query. During execution-time pruning, the database server performs a more rigorous pruning analysis on each of the partitions within the not-pruned range. In the execution-time pruning, the database server compares (1) the constituent-key-ranges associated with each of the partitions in the not-pruned range with (2) the stored predicates, in an attempt to further reduce the number of not-pruned partitions. For example, the compile-time pruning may prune partitions based on predicates that involve the lower-order key columns of a composite partitioning key. After the execution-time pruning, the list of remaining not-pruned partitions may be non-contiguous.

Continuing with the example given above, the database server reads the stored predicate "B<5" and compares the predicate against the constituent-key-range for column B of each of the partitions in the not-pruned range (p0 to p3). Based on these comparisons, the database server would determine that it is not possible for data items in p1 and p2 to satisfy the predicate "B<5". Therefore, p1 and p2 would be pruned, leaving only partitions p0 and p3. Consequently, during the execution of the query, only partitions p0 and p3 are read by the database server.

Performing pruning in two phases in this manner balances the performance considerations with storage considerations. For example, the amount of data required to identify a not-pruned range may be significantly less than the amount of data required to identify each individual not-pruned partition. Thus, because only the not-pruned range is identified in the compile-time pruning, only a small amount of data needs to be stored between query executions. Further, because a more thorough pruning analysis is performed before executing the query, the performance of the query may be significantly better than would result if only compile-time pruning were performed.

Two-phase performance of partition pruning is merely one example of how the partition pruning techniques described herein may be implemented. In alternative embodiments, all partition pruning may be performed at compile time, or all partition pruning may be performed at execution time. The pruning techniques described herein are therefore not limited to embodiments that perform pruning in multiple phases.

Pruning when a Global Index Access Path is Used

When processing queries that have predicates that involve an indexed column, the database server has to decide whether to use the index during execution of the query. For example, consider a table tb3 defined as follows:

```
create table tb3 (a number, b number) partition by range (a)
  (partition p0 values less than (5),
    partition p1 values less than (10));
```

Assume that an index has been built on column b, as follows:
create index idx1 on tb3 (b) global
If the database server receives the following query
select * from tb3 where a<5 and b=5;
the database server must determine whether to use the index of column b to answer the query. With prior database servers, if the database server chooses to use index idx1, then the database server may fail to determine that only partition p0 needs to be accessed. Instead, the index would be used to obtain the row identifiers ("rowids") of all rows where b=5.

For each rowid returned from the index, the database server would probe into the table tb3, and then use the predicate on column "a<5" to eliminate rows. The probes into partition p1 are wasteful, since all rows within partition p1 will be eliminated by the predicate "a<5".

According to one embodiment, even when the database server selects an execution plan that uses the index idx1, the predicate "a<5" is stored with the execution plan. During execution of the query, the predicate "a<5" is compared against the bounds of the partitions of table tb3, to determine which partitions of tb3 could possibly contain data items that satisfy the condition "a<5". In this example, it is only possible for partition p0 to contain data items that satisfy the condition "a<5". Therefore, when the index returns a rowid that would cause a probe into partition p1, the rowid is discarded without performing the probe, and another rowid is fetched from the index.

Pruned-Partitioned Bit Vector

According to one embodiment, when the database server decides to use an execution plan that uses a global index access path, the database server saves predicate information, which identifies one or more predicates of the query, with the execution plan.

During execution of the plan, the database server uses the stored predicate information to build a bit vector to identify which partitions are pruned out. For example, each partition may have a corresponding bit in the bit vector. If the database server determines, based on the predicate information, that a particular partition cannot possibly satisfy the condition, then the bit, within the bit vector, that corresponds to that particular partition is set to one value (e.g. 0). Otherwise, the corresponding bit is set to a different value (e.g. 1).

After the bit vector has been set in this manner, the bit vector may be used to quickly determine which partitions have been pruned out. Specifically, when the index returns a rowid, the database server determines, based on the rowid, the partition in which the row resides. The database server then inspects the bit vector to determine whether that partition has been pruned. If the partition has been pruned, then the rowid is discarded without probing into the partition. Otherwise, the database server probes into the partition, retrieves the row, and determines whether to discard the row based on whether the row satisfies all of the conditions specified in the query.

Pruning in the Presence of "OR" Predicates

The predicate of a query may contain any number of conditions. Typically, the conditions are combined together using Boolean operators to form a Boolean expression. Prior database servers typically employed pruning mechanisms that identified a single contiguous not-pruned range based on such expressions. Consequently, it was common for such pruning mechanism to not prune partitions that could be pruned, particularly for queries that combine conditions using the Boolean operator "OR".

For example, consider the table tb4 defined as follows:

```
create table tb4 (a number, b number) partition by range (a)
  (partition p0 values less than (5),
    partition p1 values less than (10),
    partition p2 values less than (15));
```

In prior systems, a query such as:
select * from tb1 where a<5 or a>11;
would cause the database server to establish a not-pruned range of p0 to p2, since p0 is the lower bound partition for the expression "a<5 or a>11", and p2 is the upper bound partition for the expression "a<5 or a>11". Because the not-pruned range is p0 to p2, the database server would access all of the partitions of tb4, even though partition p1 could not possibly satisfy the expression "a<5 or a>11".

To avoid this situation, a pruning mechanism is provided which traverses the "OR" chains at compile time to find all predicates on partitioning columns. If predicates on partitioning columns are present in all OR branches, then pruning is possible, and the predicate information of the query is saved.

When the query is executed, the predicate information is inspected, and a not-pruned set is determined for each OR predicate. The not-pruned sets thus produced are then combined ("ORed") to create a composite not-pruned set for the entire expression. Partitions that are not in the composite not-pruned set are then pruned during execution of the query.

For example, during compile time, the database server would determine that the expression "a<5 or a>11" includes predicates on the partitioning column of tb4 in all OR branches of the predicate. Therefore, the predicate information would be saved. During execution time, the database server would read the saved predicate information, and determine the constituent OR predicates. In this example, the expression "a<5 or a>11" includes the OR predicate "a<5" and the OR predicate "a>11". For the OR predicate "a<5", the database server would generate a not-pruned set that would include only partition p0 of tb4. For the OR predicate "a>11", the database server would generate a not-pruned set that would include only partition p2 of tb4. The union of the two not-pruned sets would yield a composite not-pruned set that includes p0 and p2, but not p1. The composite not-pruned set would be used to exclude p1 from consideration during execution of the query.

Identifying the Branches

The saved predicate information may represent an arbitrarily complex tree of predicates. According to one embodiment, at execution time, the predicate tree is converted into a DNF (disjunctive normal form) tree. Each branch of a DNF tree is a predicate that is combined with other predicates using the OR operator.

For example, assume that a predicate has the form "A AND (B OR C)". When converted to DNF form, the same predicate is "(A AND B) OR (A AND C)". The new predicate "(A AND B) OR (A AND C)" represents the same logic as "A AND (B OR C)", but represents that logic as a series of ORed predicates.

For each of the branches of the DNF tree, the database server (1) builds a separate partition pruning descriptor, (2) creates a bit vector to represent the list of not-pruned partitions for the branch, and (3) sets the bits in the bit vector based on the partition pruning descriptor. The bit vectors are then ORed together to create a composite bit vector that indicates the not-pruned set of partitions for the query.

Hardware Overview

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for implementing the techniques described herein. According to one embodiment of the invention, those techniques are performed by computer system 100 in response to processor 104 executing one or more sequences of one or more instructions contained in main memory 106. Such instructions may be read into main memory 106 from another machine-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 100, various machine-readable media are involved, for example, in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution. In this manner, computer system 100 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method of partition pruning, comprising:
   receiving a query that requests retrieval of data items from a partitioned object that is partitioned into a plurality of partitions based, at least in part, on partitioning criteria;
   wherein the partitioning criteria associates, for each partition of the plurality of partitions, a different set of one or more key values with said each partition;
   wherein the partitioning criteria establishes an order of the plurality of partitions;
   identifying a plurality of conditions specified in a predicate of the query, wherein:
      the plurality of conditions includes a first condition and a second condition that specifies a non-equality condition,
      the first condition and the second condition are combined using an OR operation,
      the first condition corresponds to a first set of one or more key values and the second condition corresponds to a second set of key values, and
      none of the one or more key values in the first set is in the second set of key values;
   based on the plurality of conditions, determining a non-contiguous set of not-pruned partitions;
   wherein a particular partition, of the plurality of partitions, (a) is not a member of said non-contiguous set of not-pruned partitions and (b) is between two partitions of the set of not-pruned partitions based on the order of the plurality of partitions; and
   during execution of the query, only accessing data items in partitions of said partitioned object that reside in partitions that are members of said non-contiguous set of not-pruned partitions;
   wherein the method is performed by one or more computing devices.

2. The method of claim 1, wherein:
   the method further includes, prior to determining the non-contiguous set of not-pruned partitions, pruning one or more partitions of the partitioned object to establish a contiguous set of not-pruned partitions; and
   the step of determining a non-contiguous set of not-pruned partitions is performed by pruning one or more partitions from the contiguous set of not-pruned partitions.

3. The method of claim 2, wherein:
   the step of pruning one or more partitions of the partitioned object to establish a contiguous set of not-pruned partitions is performed when the query is compiled; and
   the step of determining a non-contiguous set of not-pruned partitions is performed when the query is executed.

4. The method of claim 1, wherein the query does not include an IN list and does not explicitly reference partitions.

5. The method of claim 1, wherein the query includes an IN list and does not explicitly reference partitions.

6. The method of claim 1, wherein the step of determining the non-contiguous set of not-pruned partitions includes:
   constructing a first bit vector for the first condition, wherein the first bit vector indicates a first not-pruned set of partitions for the first condition;
   constructing a second bit vector for the second condition, wherein the second bit vector indicates a second not-pruned set of partitions for the second condition; and
   performing a union between the bit vectors to generate a composite bit vector that represents said non-contiguous set of not-pruned partitions.

7. The method of claim 1, wherein:
   the plurality of conditions includes a third condition that is combined with the first and second conditions with an AND operation;
   determining a non-contiguous set of not-pruned partitions comprises converting the predicate into a disjunctive normal form; and
   the logic of the predicate of the query is the same as the logic of the converted predicate.

8. The method of claim 7, wherein:
   the converted predicate comprises a plurality of branches, each of which is separated by an OR operation and corresponds to one or more conditions in the plurality of conditions;
   the method further comprising:
      for each branch of the plurality of branches:
         creating a bit vector, and
         setting one or more bits in the bit vector based on the one or more conditions that correspond to said each branch;
      performing a union between each of the bit vectors to generate a composite bit vector; and
   the composite bit vector indicates the non-contiguous set of not-pruned partitions.

9. One or more machine-readable storage media storing instructions which, when executed by one or more processors, cause:
   receiving a query that requests retrieval of data items from a partitioned object that is partitioned into a plurality of partitions based, at least in part, on partitioning criteria;
   wherein the partitioning criteria associates, for each partition of the plurality of partitions, a different set of one or more key values with said each partition;
   wherein the partitioning criteria establishes an order of the plurality of partitions;
   identifying a plurality of conditions specified in a predicate of the query, wherein:
      the plurality of conditions includes a first condition and a second condition that specifies a non-equality condition,
      the first condition and the second condition are combined using an OR operation,
      the first condition corresponds to a first set of one or more key values and the second condition corresponds to a second set of key values, and
      none of the one or more key values in the first set is in the second set of key values;
   based on the plurality of conditions, determining a non-contiguous set of not-pruned partitions; and wherein a particular partition, of the plurality of partitions, (a) is not a member of said non-contiguous set of not-pruned partitions and (b) is between two partitions of the set of not-pruned partitions based on the order of the plurality of partitions; and during execution of the query, only accessing data items in partitions of said partitioned object that reside in partitions that are members of said non-contiguous set of not-pruned partitions.

10. The one or more machine-readable storage media of claim 9, wherein:

the instructions, when executed by the one or more processors, further cause, prior to determining the non-contiguous set of not-pruned partitions, pruning one or more partitions of the partitioned object to establish a contiguous set of not-pruned partitions; and determining a non-contiguous set of not-pruned partitions is performed by pruning one or more partitions from the contiguous set of not-pruned partitions.

11. The one or more machine-readable storage media of claim 10, wherein:

pruning one or more partitions of the partitioned object to establish a contiguous set of not-pruned partitions is performed when the query is compiled; and determining a non-contiguous set of not-pruned partitions is performed when the query is executed.

12. The one or more machine-readable storage media of claim 9, wherein the query does not include an IN list and does not explicitly reference partitions.

13. The one or more machine-readable storage media of claim 9, wherein the query includes an IN list and does not explicitly reference partitions.

14. The one or more machine-readable storage media of claim 9, wherein determining the non-contiguous set of not-pruned partitions includes:

constructing a first bit vector for the first condition, wherein the first bit vector indicates a first not-pruned set of partitions for the first condition;

constructing a second bit vector for the second condition, wherein the second bit vector indicates a second not-pruned set of partitions for the second condition; and performing a union between the first and second bit vectors to generate a composite bit vector that represents said non-contiguous set of not-pruned partitions.

15. The one or more machine-readable storage media of claim 9, wherein:

the plurality of conditions includes a third condition that is combined with the first and second conditions with an AND operation;

determining a non-contiguous set of not-pruned partitions comprises converting the predicate into a disjunctive normal form; and the logic of the predicate of the query is the same as the logic of the converted predicate.

16. The one or more machine-readable storage media of claim 15, wherein:

the converted predicate comprises a plurality of branches, each of which is separated by an OR operation and corresponds to one or more conditions in the plurality of conditions;

the instructions, when executed by the one or more processors, further cause:

for each branch of the plurality of branches:
creating a bit vector, and
setting one or more bits in the bit vector based on the one or more conditions that correspond to said each branch;

performing a union between each of the bit vectors to generate a composite bit vector; and the composite bit vector indicates the non-contiguous set of not-pruned partitions.

17. The method of claim 1, wherein:

determining the non-contiguous set of not-pruned partitions comprises determining, based on the first condition, a first not-pruned set of one or more partitions and determining, based on the second condition, a second not-pruned set of one or more partitions;

the method further comprises combining the first and second not-pruned sets to create the non-contiguous set of not-pruned conditions.

18. The one or more machine-readable storage media of claim 9, wherein:

determining the non-contiguous set of not-pruned partitions comprises determining, based on the first condition, a first not-pruned set of one or more partitions and determining, based on the second condition, a second not-pruned set of one or more partitions;

the instructions, when executed by the one or more processors, further cause combining the first and second not-pruned sets to create the non-contiguous set of not-pruned conditions.

* * * * *